United States Patent
Yoshida

(10) Patent No.: US 7,539,618 B2
(45) Date of Patent: May 26, 2009

(54) SYSTEM FOR OPERATING DEVICE USING ANIMATED CHARACTER DISPLAY AND SUCH ELECTRONIC DEVICE

(75) Inventor: Ichiro Yoshida, Takahama (JP)

(73) Assignee: DENSO CORPORATION, Kariya (JP)

( * ) Notice: Subject to any disclaimer, the term of this patent is extended or adjusted under 35 U.S.C. 154(b) by 517 days.

(21) Appl. No.: 11/283,909

(22) Filed: Nov. 22, 2005

(65) Prior Publication Data

US 2006/0129637 A1   Jun. 15, 2006

(30) Foreign Application Priority Data

Nov. 25, 2004   (JP)   ............................. 2004-340455

(51) Int. Cl.
| | |
|---|---|
| G10L 21/00 | (2006.01) |
| G10L 11/00 | (2006.01) |
| G10L 21/06 | (2006.01) |
| G06F 3/16 | (2006.01) |
| G06F 3/00 | (2006.01) |

(52) U.S. Cl. .................... 704/270.1; 704/270; 704/276; 715/727; 715/733

(58) Field of Classification Search ........................ None
See application file for complete search history.

(56) References Cited

U.S. PATENT DOCUMENTS

| | | | |
|---|---|---|---|
| 4,817,156 A * | 3/1989 | Bahl et al. ............... | 704/256.2 |
| 6,249,720 B1 | 6/2001 | Kubota et al. | |
| 6,351,698 B1 * | 2/2002 | Kubota et al. ................. | 701/51 |
| 7,373,375 B2 * | 5/2008 | Suzuki ........................ | 709/202 |
| 2003/0167167 A1 * | 9/2003 | Gong .......................... | 704/250 |

FOREIGN PATENT DOCUMENTS

| | | |
|---|---|---|
| JP | A-H09-102098 | 4/1997 |
| JP | A-H11-259271 | 9/1999 |
| JP | A-H11-259446 | 9/1999 |

OTHER PUBLICATIONS

Duffy et al., "Agent chameleons: agent minds and bodies", 16th International Conference on Computer Animation and Social Agents, pp. 118-125, May 2003.*

Tomlinson et al., "The Virtual Raft Project: A Mobile Interface for Interacting with Communities of Autonomous Characters", ACM Conference On Human Factors In Computing Systems, pp. 1150-1151, Apr. 2005.*

(Continued)

Primary Examiner—David R Hudspeth
Assistant Examiner—Brian L Albertalli
(74) Attorney, Agent, or Firm—Posz Law Group, PLC

(57) ABSTRACT

A system for operating an electronic device enabling the same agent software to be used in common among a plurality of devices, where a car navigation system or audio system, when the agent software and voice recognition engine are transferred from a portable data terminal, runs the transferred agent software so as to display a simulated human animated character which converses with a user, recognizes speech obtained from that conversation by a voice recognition engine, prepares script reflecting the content of the conversation, and executes the prepared script to perform predetermined processing.

6 Claims, 12 Drawing Sheets

OTHER PUBLICATIONS

Sumi et al., "AgentSalon: Facilitating Face-to-Face Knowledge Exchange through Conversations Among Personal Agents", Proceedings of the fifth international conference on Autonomous agents, pp. 393-400, 2001.*

McIntyre et al., "Net-mobile embodied agents", Proceedings of Sony Research Forum, 1999.*

Rekimoto, "Pick-and-Drop: A Direct Manipulation Technique for Multiple Computer Environments", Proceedings of UIST'97, pp. 31-39, 1997.*

* cited by examiner

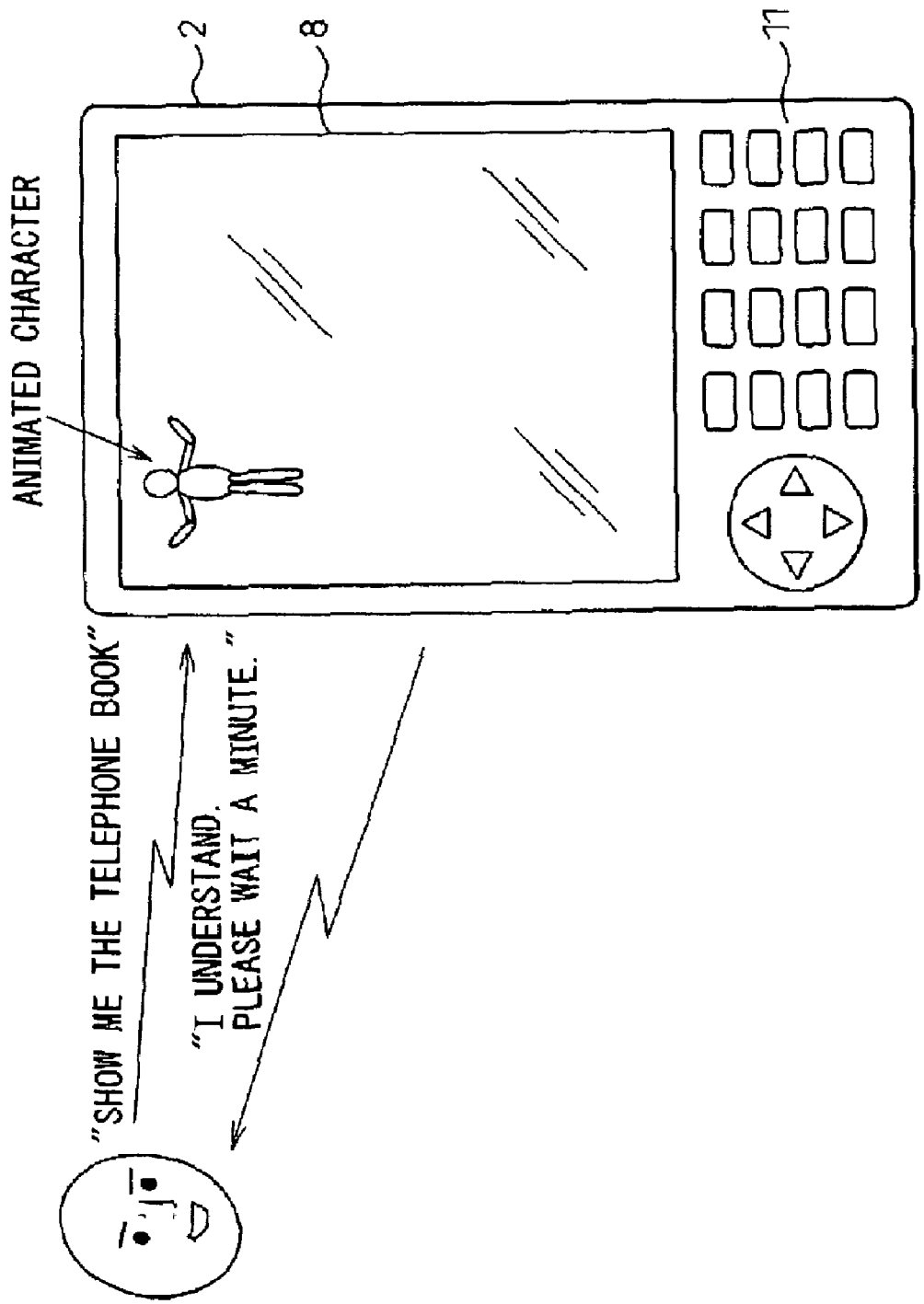

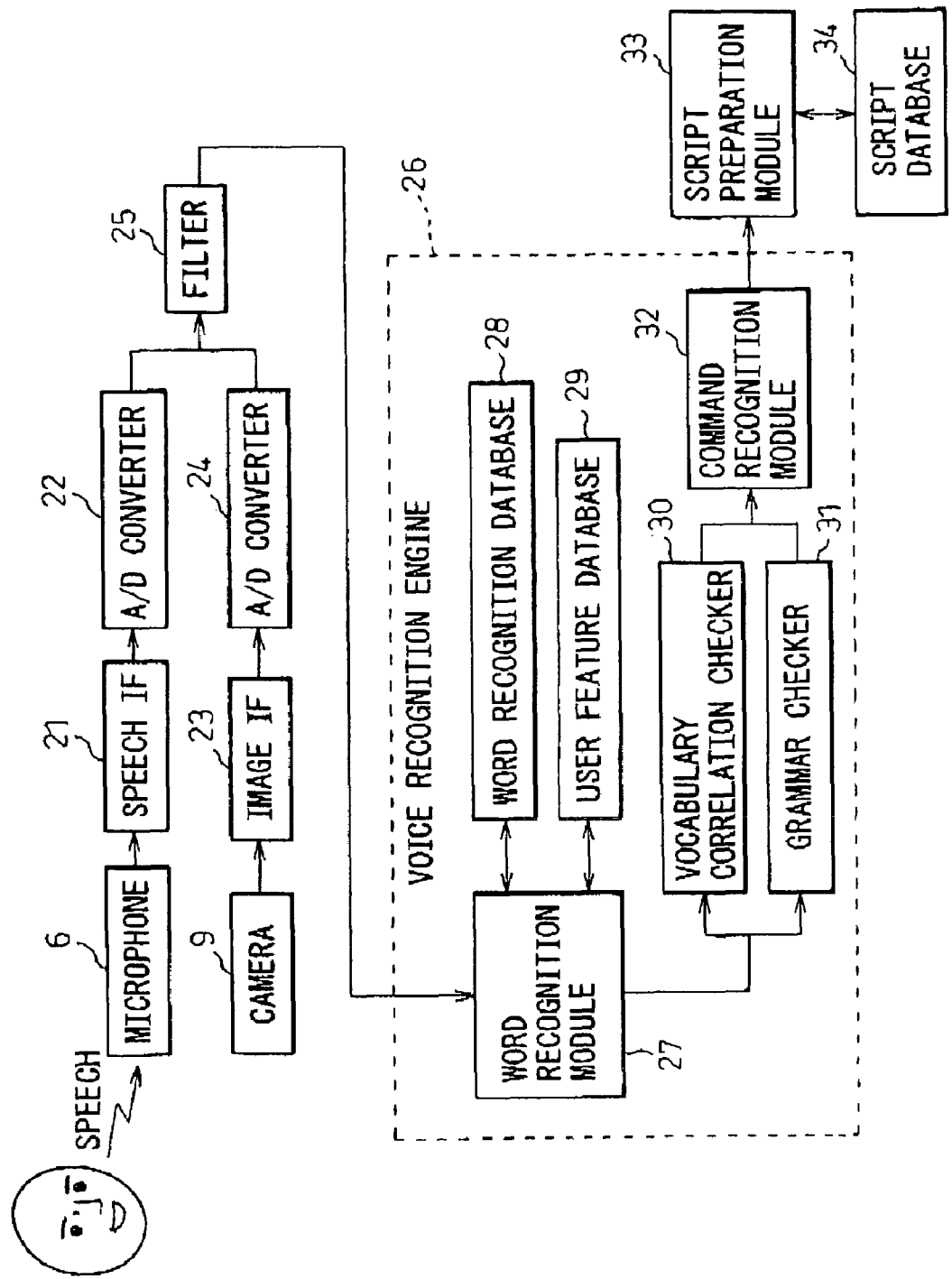

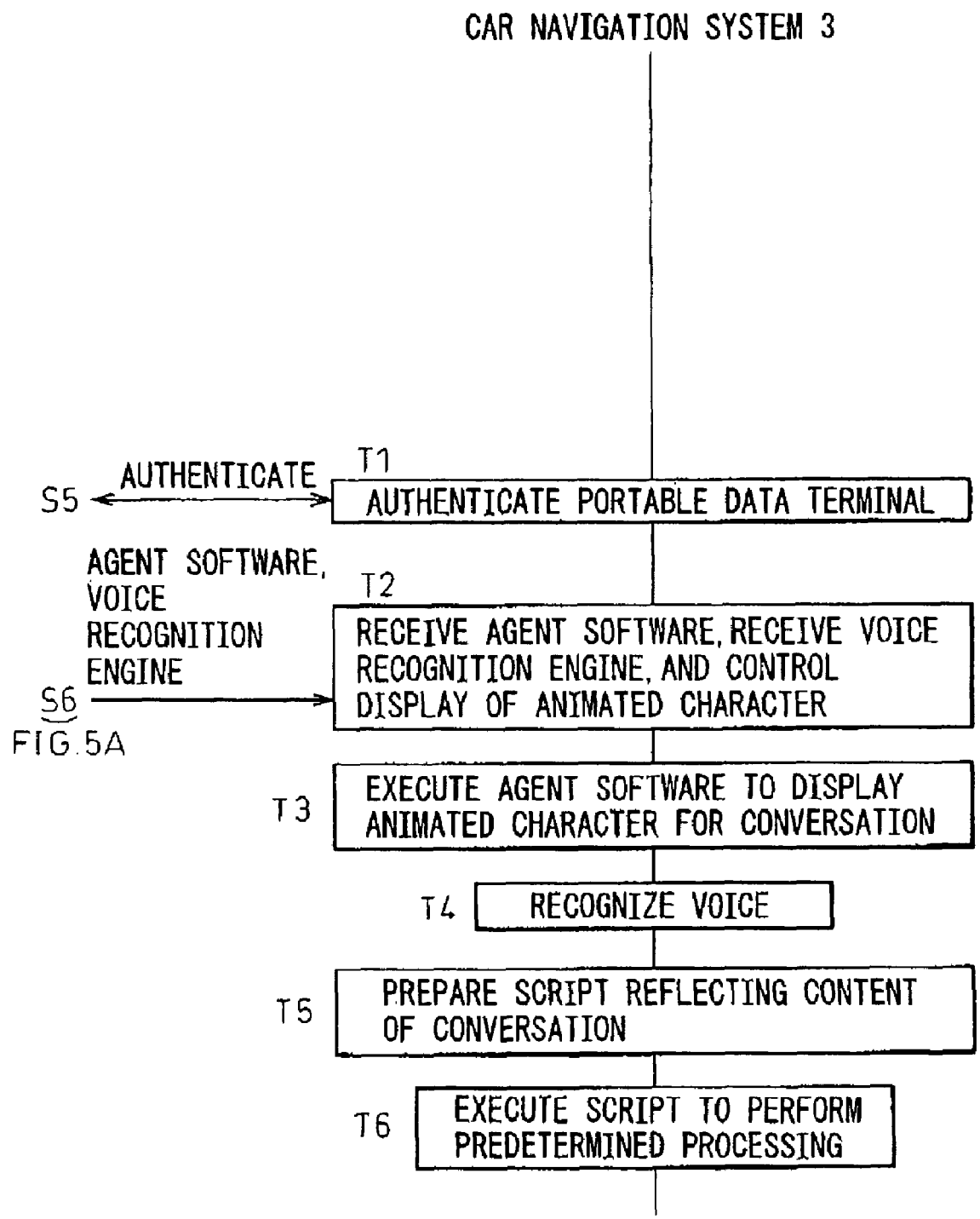

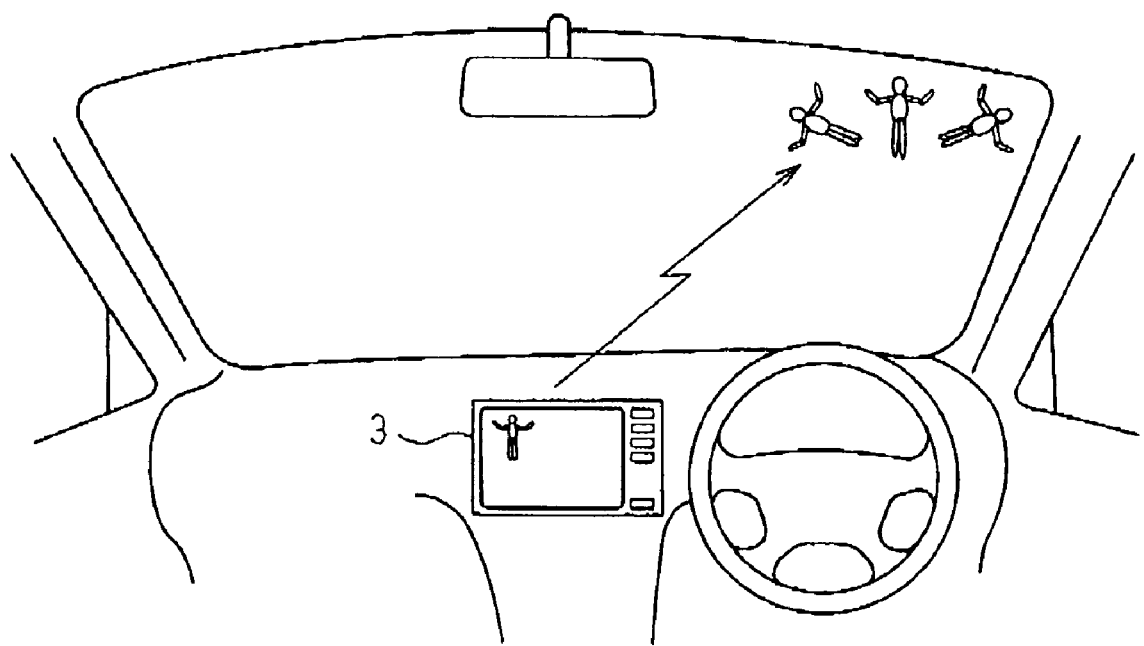

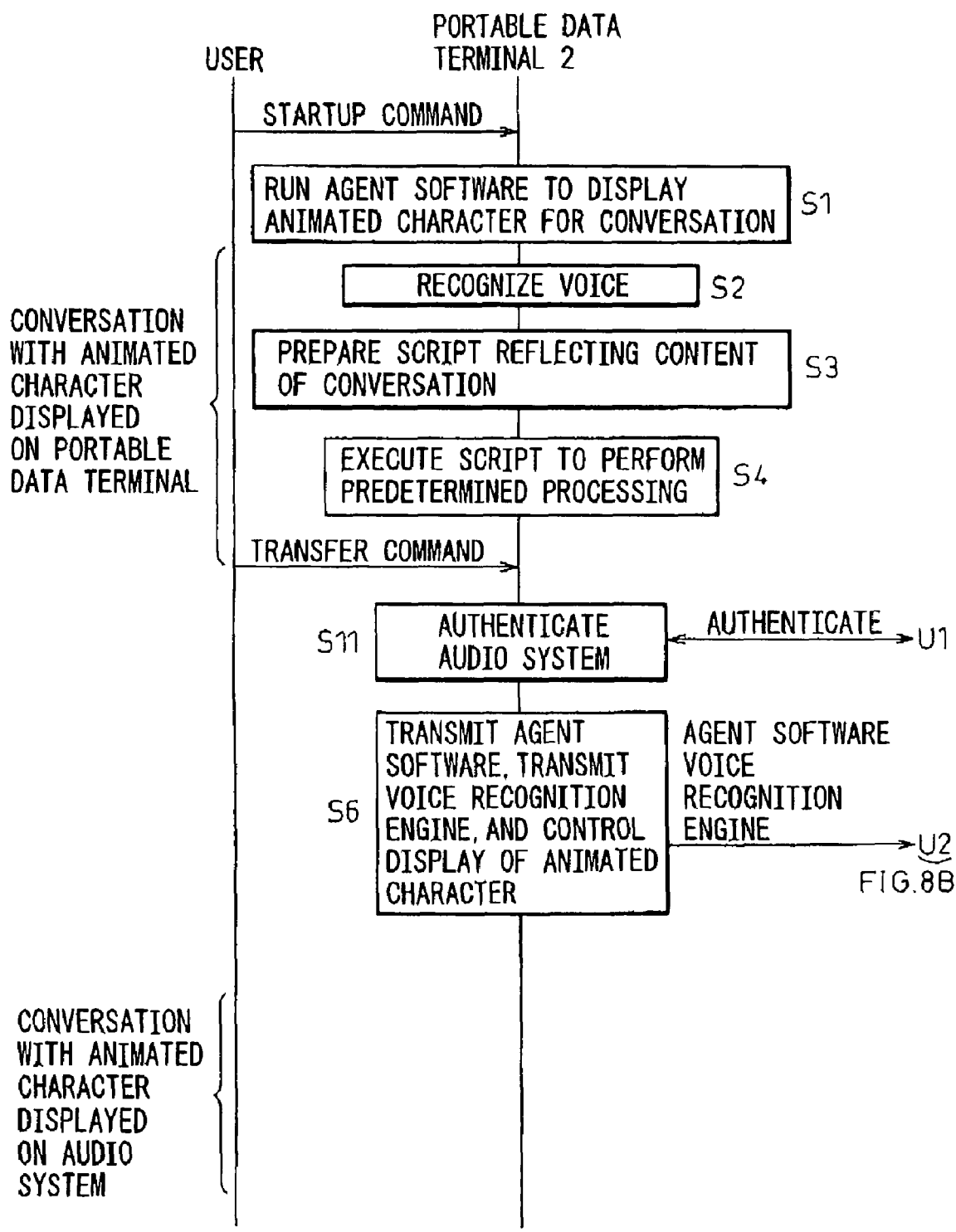

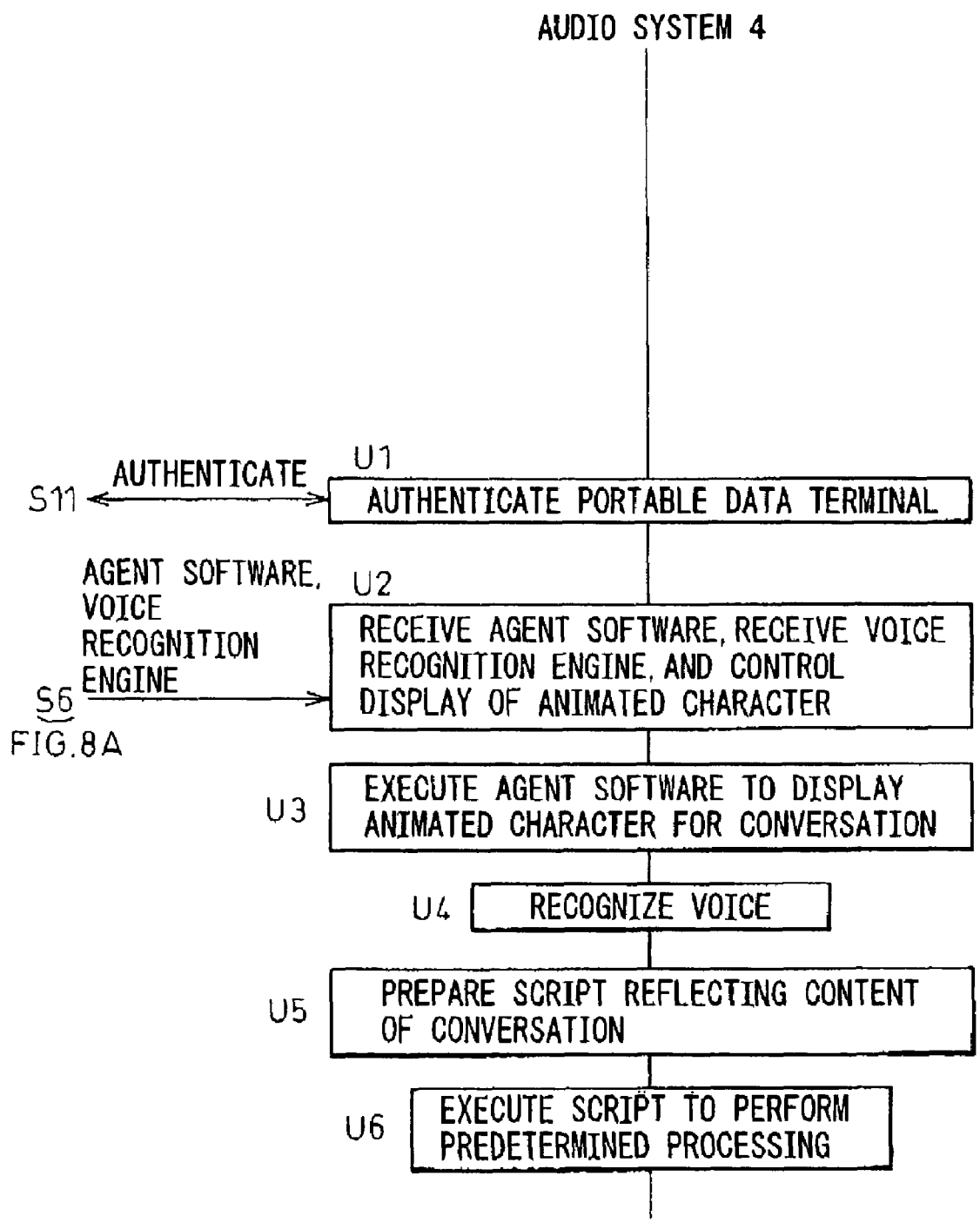

SYSTEM FOR OPERATING DEVICE USING ANIMATED CHARACTER DISPLAY AND SUCH ELECTRONIC DEVICE

BACKGROUND OF THE INVENTION

1. Field of the Invention

The present invention relates to a system for operating an electronic device utilizing an animated character display which displays a simulated human animated character which converses with the user and performs predetermined processing reflecting the content of the conversation and an electronic device used in that system for operating an electronic device.

2. Description of the Related Art

For example, in a car navigation system, there is a function called an "agent". This agent function displays a simulated human animated character which converses with the user and performs predetermined processing reflecting the content of the conversation. For example, when the user speaks a specific prerecorded command, the processing corresponding to that predetermined command is automatically executed, then information relating to the operation such as road guidance is provided to the user by audio or video (for example, see Japanese Patent Publication (A) No. 9-102098, Japanese Patent Publication (A) No. 11-259271, and Japanese Patent Publication (A) No. 11-259446).

This agent function can be realized not only in car navigation systems, but also portable data terminals carried by users, home appliances installed in the home, etc. However, the functions described in the above patent publications limit the agent functions to the specific hardware. That is, it is difficult to transfer agent software between hardware. It is hard to use the same agent software by a plurality of hardware.

Therefore, even if a user uses the agent function of his portable data terminal on a trip, he cannot use the agent function of the portable data terminal in his car navigation system when returning to his car. That is, the user has to differentiate between commands for his portable data terminal and commands for his car navigation system even when desiring to have the portable data terminal and car navigation system perform the same processing. Therefore, there was the problem of a poor level of convenience. Further, when a user wishes to change car navigation systems, he must differentiate between the commands for the old car navigation system and the commands for the new car navigation system. In this case as well, there was the problem of a poor level of convenience.

SUMMARY OF THE INVENTION

An object of the present invention is to provide a system for operating an electronic device utilizing an animated character display enabling the same agent software to be used in common among a plurality of devices and thereby able to improve the human interface and able to improve the level of convenience and an electronic device used in such a system for operating an electronic device.

To attain the above object, according to the system of the present invention, there is provided a system for operating an electronic device enabling the same agent software to be used in common among a plurality of devices, where a car navigation system or audio system, when the agent software and voice recognition engine are transferred from a portable data terminal, runs the transferred agent software so as to display a simulated human animated character which converses with a user, recognizes speech obtained from that conversation by a voice recognition engine, prepares script reflecting the content of the conversation, and executes the prepared script to perform predetermined processing.

BRIEF DESCRIPTION OF THE DRAWINGS

These and other objects and features of the present invention will become clearer from the following description of the preferred embodiments given with reference to the attached drawings, wherein:

FIGS. 3A and 3B are views showing modes of display of a telephone book by a portable data terminal;

FIG. 4 is a view schematically showing the configuration of a voice recognition engine;

FIGS. 5A and 5B are views of the sequence when a user transfers agent software from a portable data terminal to a car navigation system;

FIG. 7 is a view schematically showing a mode by which an animated character is displayed on a front window;

FIGS. 8A and 8B are views of the sequence when a user transfers agent software from a portable data terminal to an audio system.

DESCRIPTION OF THE PREFERRED EMBODIMENTS

Figure 1:
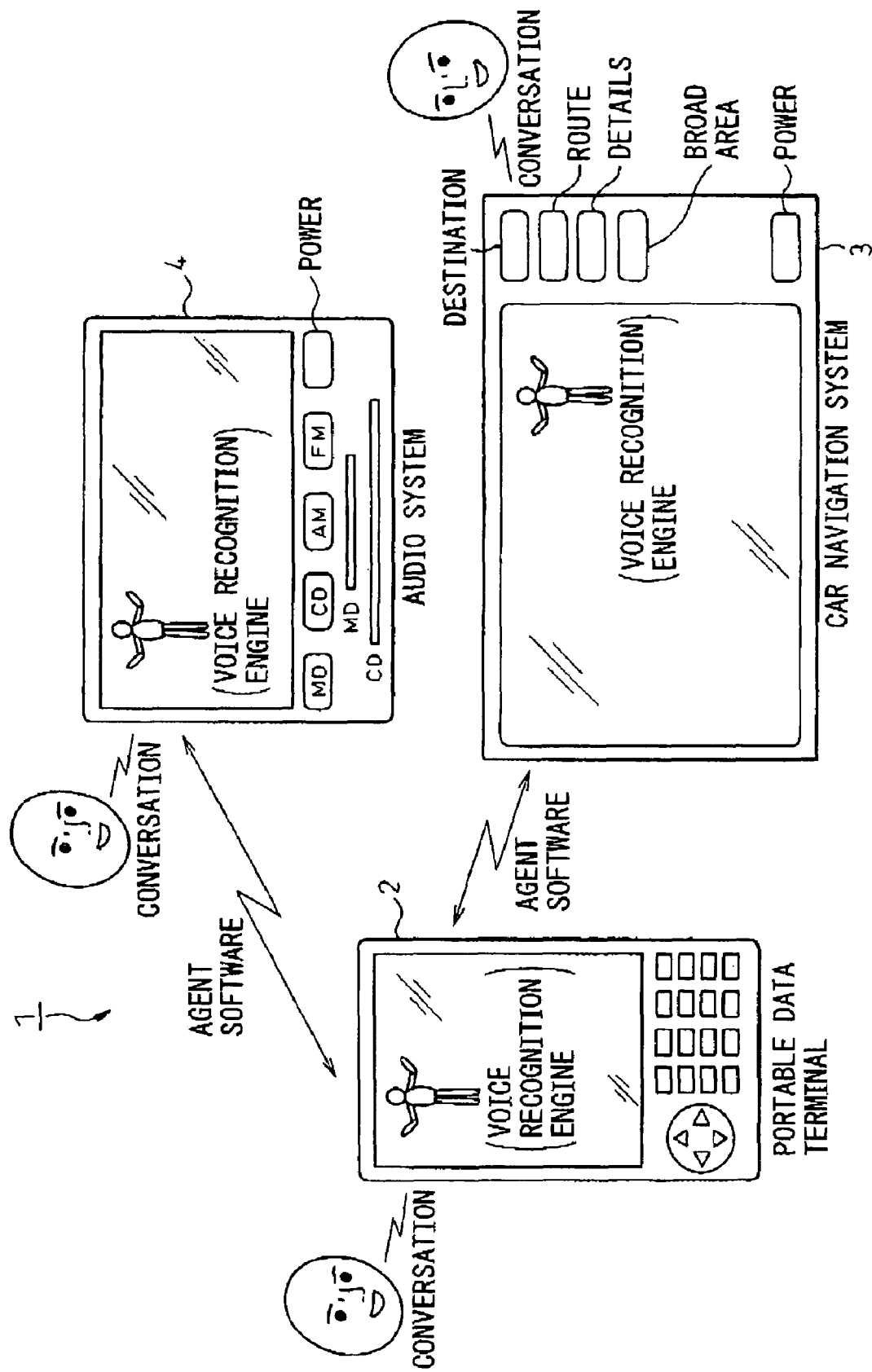
FIG. 1 is a view schematically showing an embodiment of the present invention.

Preferred embodiments of the present invention will be described in detail later while referring to the attached FIG. 1 to FIG. 9. Before this, the present invention will be summarized.

In a system for operating an electronic device using an animated character display according to a first aspect of the present invention, a first electronic devices runs agent software so as to display a simulated human animated character which converses with the user, recognizes the speech obtained from the conversation by a voice recognition engine, prepares script reflecting the content of the conversation, and executes the prepared script to perform predetermined processing. When for example the user issues a command to transfer the agent software, the agent software and voice recognition engine corresponding to that agent software are transferred to a second electronic device.

The second electronic device runs the agent software so as to display the simulated human animated character which converses with the user, recognizes the speech obtained from the conversation by the voice recognition engine, prepares script reflecting the content of the conversation, and executes the prepared script to perform predetermined processing. That is, the agent software and the voice recognition engine are transferred from the first electronic device and the second electronic device runs the transferred agent software so as to display the simulated human animated character which converses with the user, recognizes the speech obtained from the conversation by the voice recognition engine, prepares script reflecting the content of the conversation, and executes the prepared script to perform predetermined processing.

Therefore, when the agent software and voice recognition engine corresponding to the agent software are transferred from the first electronic device to the second electronic device, the second electronic device to which the agent software is transferred runs the agent software transferred from the first electronic device, recognizes the speech by the voice recognition engine transferred from the first electronic device, prepares script reflecting the content of the conversation, and executes the prepared script to perform predetermined processing, so can run the agent software in the same way as the first electronic device running the engine software.

That is, when the first electronic device is a portable data terminal and the second electronic device is a car navigation system, the user transfers the agent software and the voice recognition engine corresponding to the agent software between the portable data terminal and the car navigation system and thereby can issue the same specific command to make both the portable data terminal and the car navigation system perform the same processing without having to differentiate between a specific command for the portable data terminal and a specific command for the car navigation system. That is, the user can use the car navigation system in accordance with the same procedure as the procedure for operating the portable data terminal and thereby it is possible to improve the human interface and possible to improve the level of convenience.

Further, when the user replaces the car navigation system, that is, when the first electronic device is the old car navigation system and the second electronic device is the new car navigation system, by transferring the agent software and voice recognition engine corresponding to the agent software between the old car navigation system and new car navigation system, it is possible to issue the same specific command to make both the old car navigation system and the new car navigation system perform the same processing without having to differentiate between a specific command for the old car navigation system and a specific command for the new car navigation system. That is, the user can use the new car navigation system in accordance with the same procedure as the procedure for operating the old car navigation system and thereby can improve the human interface and possible to improve the level of convenience.

In a system for operating an electronic device using an animated character display according to a second aspect of the present invention, the first electronic device has the function of updating the precision of voice recognition in the voice recognition engine. Due to this, it is possible to improve the precision of voice recognition in conversation with the user and possible to realize a system with a high precision of voice recognition.

In a system for operating an electronic device using an animated character display according to a third aspect of the present invention, the first electronic device changes the animated character corresponding to the agent software in the middle of transfer of the agent software to the second electronic device and the second electronic device changes the display of the animated character corresponding to the agent software in the middle of transfer of the agent software from the first electronic device. Due to this, the first electronic device can inform, by changing the display of the animated character, the user that the agent software is in the middle of transfer to the second electronic device, and the second electronic device can inform, by changing the display of the animated character, the user that the agent software is in the middle of transfer from the first electronic device.

In a system for operating an electronic device using an animated character display according to a fourth aspect of the present invention, the first electronic device changes the display of the animated character corresponding to the agent software based on the amount of data transferred and the second electronic device changes the display of the animated character corresponding to the agent software based on the amount of data transferred. Due to this, the first electronic device can inform the user of the degree of the amount of data finished being transferred to the second electronic device, while the second electronic device can inform the user of the degree of the amount of data finished being transferred from the first electronic device.

In a system for operating an electronic device using an animated character display according to a fifth aspect of the present invention, the first electronic device or second electronic device changes the display of the animated character in accordance with the content of the aforesaid predetermined processing. Due to this, when for example an animal is displayed as the animated character for providing road guidance, the display of the animal may be changed so that the head of the animal is directed to the forward direction so as to suitably inform the user of the forward direction by the head of the animal and suitably provide road guidance.

In a system for operating an electronic device using an animated character display according to a sixth aspect of the present invention, among the first electronic device and the second electronic device, only one of these devices can run common agent software at the same timing. Due to this, the user can limit the same agent software so that it is not simultaneously used at the first electronic device and second electronic device.

In a system for operating an electronic device using an animated character display according to a seventh aspect of the present invention, among the first electronic device and the second electronic device, both the devices can run common agent software at the same timing. Due to this, the user can simultaneously use the same agent software at the first electronic device and second electronic device.

In a system for operating an electronic device using an animated character display according to an eighth aspect of the present invention, the first electronic device is comprised of a portable terminal which a user can carry and the second electronic device is comprised of a car-mounted system mounted in a car or a home appliance installed in the home. Due to this, when the user transfer the agent software and voice recognition engine corresponding to the agent software between the personal data terminal and for example a car navigation system (or other car-mounted system) or for example an audio system (or other home appliance), then the user can use the car navigation system and home appliance in accordance with the same procedure as the procedure for operating the portable data terminal.

An electronic device according to a ninth aspect of the present invention, the device runs agent software so as to display a simulated human animated character which converses with a user, recognizes speech obtained from that conversation by a voice recognition engine, prepares script reflecting the content of the conversation, and executes the prepared script to perform the aforesaid predetermined processing, wherein the electronic device transfers agent software and a voice recognition engine corresponding to that agent software to another electronic device. Due to this, by functioning as the first electronic device in the system of the first aspect of the invention, it is possible to obtain the same action and effects as described in the first aspect and possible for the same agent software to be used in common at a plurality of devices and the level of convenience to be raised.

An electronic device according to a 10th aspect of the present invention, the device runs agent software so as to display a simulated human animated character which converses with a user, recognizes speech obtained from that conversation, prepares script reflecting the content of the conversation, and executes the prepared script to perform predetermined processing, wherein when agent software and voice recognition engine are transferred from another electronic device, then said electronic device runs the transferred agent software so as to display a simulated human animated character which converses with a user, recognizes speech obtained from that conversation by the voice recognition engine, prepares script reflecting the content of the conversation, and executes the prepared script to perform predetermined processing. Due to this, by functioning as the second electronic device in the system of the first aspect of the invention, it is possible to obtain the same action and effects as described in the first aspect and possible for the same agent software to be used in common at a plurality of devices and the level of convenience to be raised.

Below, in the first embodiment of the present invention, the first electronic device is made a portable data terminal, while the second electronic device is made a car navigation system mounted in a car and an audio system installed in the home. This will be explained with reference to the drawings.

First, FIG. 1 schematically shows the overall configuration of a system for operating an electronic device. The electronic device operating system 1 is comprised of a portable data terminal 2 able to be carried by a user, a car navigation system 3 mounted in a vehicle (referred to as a "car-mounted system" in the present invention), and an audio system 4 installed in the home (referred to as a "home appliance" in the present invention).

Figure 2:
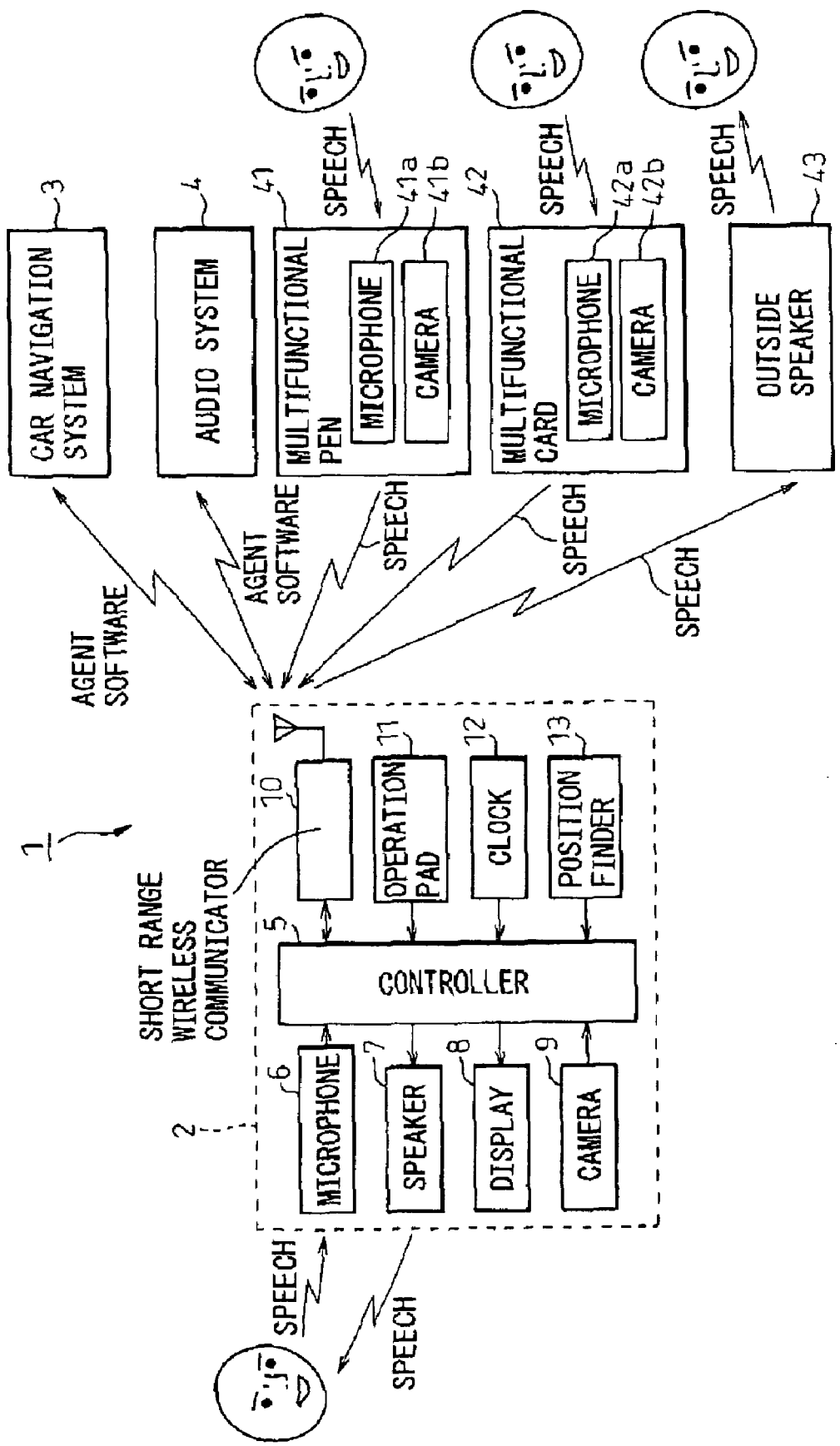
FIG. 2 is a functional block diagram showing the electrical configuration of a portable data terminal.

FIG. 2 is a functional block diagram of the electrical configuration of a portable data terminal 2. The portable data terminal 2 is comprised of a controller 5 controlling the overall operation of the terminal 2, a microphone 6 to which voice is input, a speaker 7 outputting speech, a display 8, a camera 9, a short range wireless communicator 10 for short range wireless communication, an operation pad 11 comprised of a keyboard on which several keys to be operated by a user are arranged, a clock 12 for counting time, and a position finder 13 for finding the position.

In the above configuration, the controller 5 is designed to run agent software on its platform so as to display on the display 8 a simulated human animated character which converses with the user, recognize the speech obtained from the conversation by a voice recognition engine, prepare script reflecting the content of the conversation, and execute the prepared script to perform predetermined processing. Explaining this more specifically, when the user speaks a command for starting up the agent software, as shown in FIG. 3A, the controller 5 displays an animated character of a human form on the display 8 and waits for a command from the user. For example, if the user speaks the words "show me the telephone book", the controller 5 receives as input the speech "show me the telephone book" spoken by the user from the microphone 6, recognizes the input speech by the voice recognition engine to recognize the user's command, and prepares script reflecting the content of the conversation so as to prepare script indicating the processing which it should perform. The controller 5 then executes this prepared script.

Figure 3B:
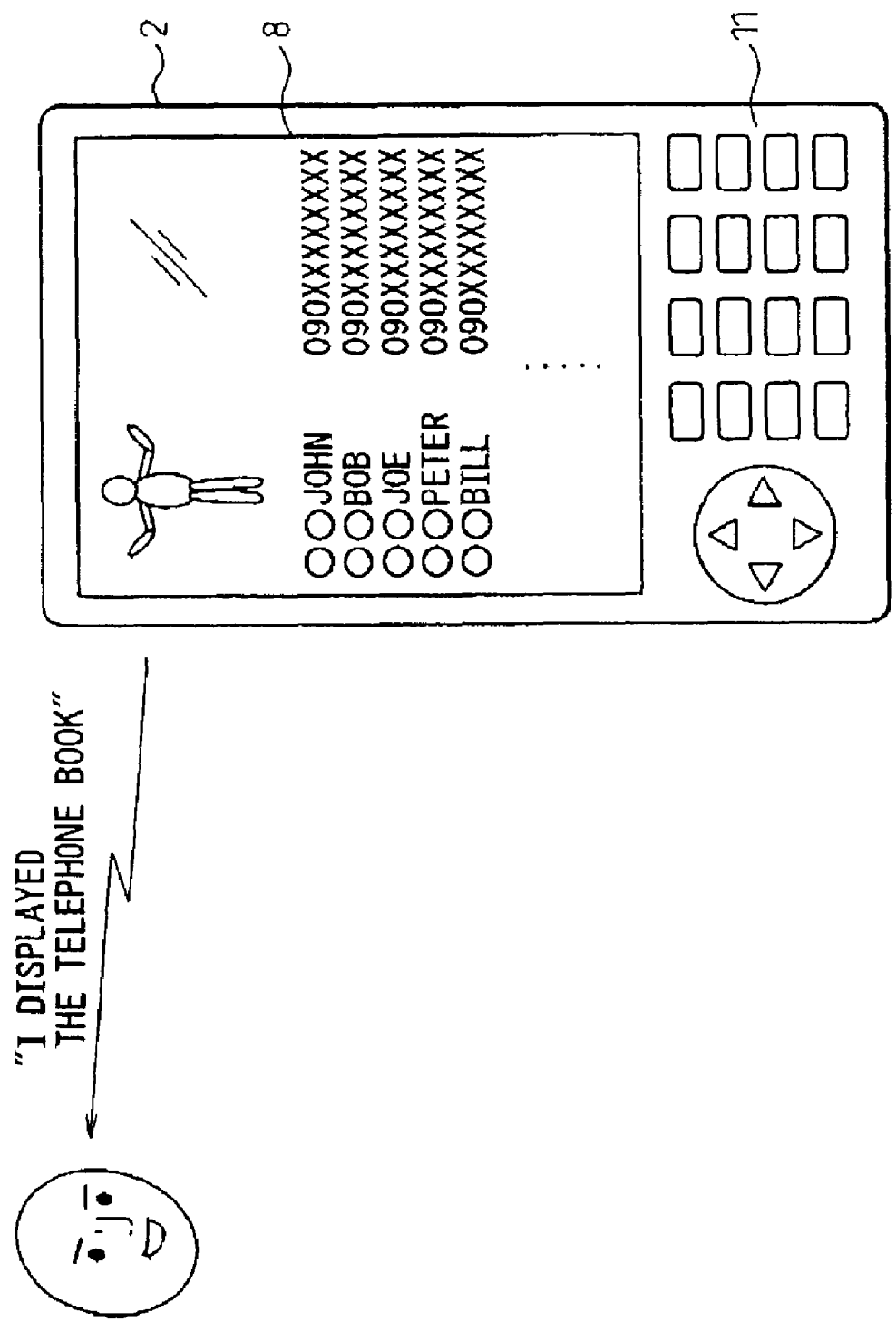
Figure 5A:
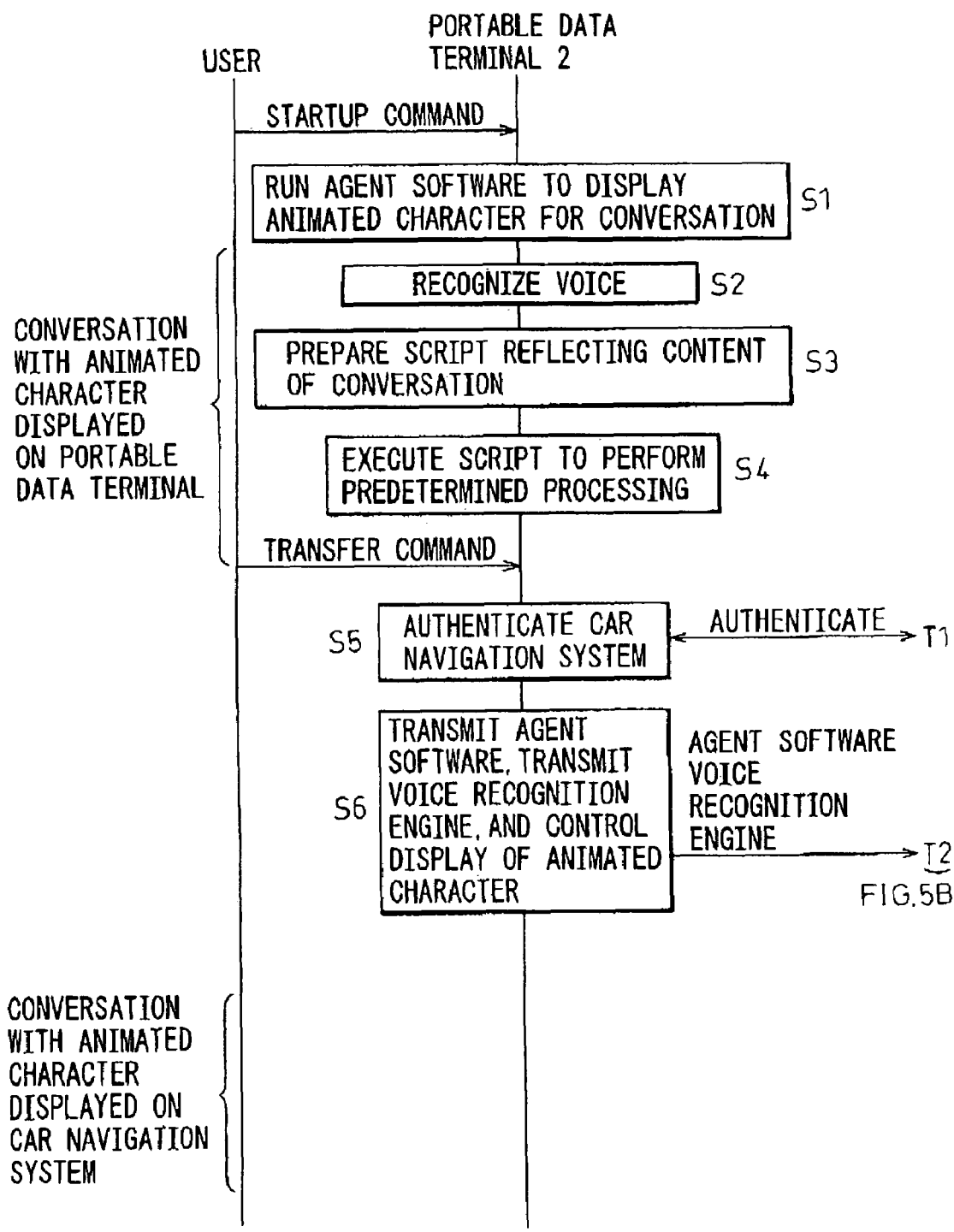

That is, in the above case, as shown in FIG. 3A, the controller 5 outputs the words "I understand. Please wait a minute" from the speaker 7 and searches for the telephone book stored in the memory (not shown) Further, when finishing the search for the telephone book, the controller 5 reads out the telephone book, displays it on the display 8, and, as shown in FIG. 3B, for example, outputs the words "I displayed the telephone book" from the speaker 7. In this way, the user can seemingly converse with the animated character displayed on the display 8 so as to make the portable data terminal 2 perform the desired processing. Further, in this embodiment, the explanation was given of the case of displaying a telephone book on the portable data terminal 2, but for example the user may give the command "send the call" so as to make the portable data terminal 2 perform an operation to make a call and connect to a network. For example, the user may give the command "answer the call" so as to make the portable data terminal 2 perform an operation to respond to a call received from the network.

Therefore, FIG. 4 schematically shows the flow of the routine by which the controller 5 prepares script. In this case, the controller 5 links the speech input from the microphone 6 and image captured by the camera 9 to prepare script. That is, the controller 5 reliably judges if the speech input from the microphone 6 is speech from the user by capturing movement of the user's mouth, his facial expression, changes in his line of sight, etc. by the camera 9 and analyzing the image and prepares script conditional on confirming that the speech input from the microphone 6 is speech from the user.

The speech interface (IF) 21 outputs the speech input from the microphone 6 to an A/D converter 2. The A/D converter 22 converts the speech input from the microphone 6 through the speech interface 21 from an analog signal to a digital signal. The image interface (IF) 23 outputs the image captured by the camera 8 to the A/D converter 24. The A/D converter 24 converts the image input from the camera 9 through the image interface 23 from an analog signal to a digital signal. A filter 25 filters the digitalized speech and digitalized image, extracts only the speech emitted by the user from all of the audio input to the microphone 6, and outputs it to the voice recognition engine 26.

The voice recognition engine 26 is comprised of a word recognition module 27, a word recognition database 28, a user feature database 29, a vocabulary correlation checker 30, a grammar checker 31, and a command recognition module 32. The word recognition module 27 refers to the word recognition data stored in the word recognition database 28 and the user feature data (tone, pitch, speed, accent, intonation, etc.) stored in the user feature database 29 to recognize the string of words (word string) spoken by the user and outputs the recognized word string to the vocabulary correlation checker 30 and grammar checker 31.

The vocabulary correlation checker 30 judges the legitimacy of the correlation of the vocabulary and corrects any erroneous points in the correlation of the vocabulary. The grammar checker 31 judges the legitimacy of the grammar and corrects any erroneous points in the grammar. The command recognition module 32 recognizes as a command a command of the user based on the words input from the word recognition module 27 through the vocabulary correlation checker 30 and grammar checker 31 and outputs the recognized command to the script preparation module 33. The script preparation module 33 refers to the script database 34 and prepares script based on the command input from the command recognition module 32. Further, the controller 5 has the function of updating the precision of voice recognition in the voice recognition engine 26 as a learning function.

The short range wireless communicator 10 of FIG. 2 is designed to enable short range wireless communication with several systems or devices arranged around the portable data terminal 2. Further, the "short range wireless communication" referred to here means the Bluetooth®, a wireless LAN, etc. In this embodiment, the portable data terminal 2 can for example wirelessly communicate over a short range with the car navigation system 3 mounted in a car when the user gets in the car and places the terminal in the car and can for example wirelessly communicate over a short range with the audio system 4 installed in the home when the user returns home and places it in the home. Further, the short range wireless communicate 10 is designed to be able to wirelessly communicate over a short range with a multifunctional pen 41, multifunctional card 42, or outside speaker 43 as well.

The multifunctional pen 41 is comprised of a microphone 41*a* having substantially the same functions as the above microphone 6 and a camera 41*b* having substantially the same functions as the above camera 9 and is designed to transmit the speech input from the microphone 41*a* and the image captured by the camera 41*b* by short range wireless communication. In this case, the camera 41*b* is arranged for example at the head of the pen body. The multifunctional pen 41 can therefore capture the image of the face of the user as seen from below when it is carried in the pocket of a jacket.

The multifunctional card 42 is also comprised of a microphone 42*a* having substantially the same functions as the above microphone 6 and a camera 42*b* having substantially the same functions as the above camera 9 and is designed to transmit the speech input from the microphone 42*a* and the image captured by the camera 42*b* by short range wireless communication. The portable data terminal 2 is designed to transmit speech to the outside speaker 43 by short range wireless communication. Further, the outside speaker 43 may be for example a bone-conduction type earphone etc.

In this configuration, even if the portable data terminal 2 is for example placed in a briefcase and cannot easily pick up the speech of the user or the image of the user, the multifunctional pen 41 or multifunctional card 42 may be placed at a position able to pick up the speech or image of the user. The user can therefore converse with the portable data terminal 2 using the microphone 41*a* and the camera 41*b* of the multifunctional pen 41 and the microphone 42*a* and camera 42*b* of the multifunctional card 42, Further, with the above configuration, both the car navigation system 3 and the audio system 4, like the portable data terminal 2, have platforms for running the agent software. By running the agent software on their platforms, they can display simulated human animated characters which converse with the user, recognize the speech obtained from the conversation by the voice recognition engine, prepare script reflecting the content of the conversation, and execute the prepared script to perform predetermined processing.

Next, the action of the above configuration will be explained with reference to FIGS. 5A and 5B to FIG. 9. Further, here, the explanation will be given of (1) the case of the user transferring the agent software from the portable data terminal 2 to the car navigation system 3 and (2) the case of the user transferring the agent software from the portable data terminal 2 to the audio system 4.

(1) Case of User Transferring Agent Software from Portable Data Terminal 2 to Car Navigation System 3

First, the "the case of the user transferring the agent software from the portable data terminal 2 to the car navigation system 3" will be explained with reference to FIG. 5A and FIG. 5B to FIGS. 6A to 6C. In this embodiment, further, the explanation was made of the case of the user directly transferring the agent software from the portable data terminal 2 to the car navigation system 3, but the user may also transfer the agent software from the portable data terminal 2 to the car navigation system 3 through a car-mounted gateway.

In this case, the user starts up the agent software at the portable data terminal 2. When the portable data terminal 2 receives a command for startup of the agent software from the user, it runs the agent software on its platform so as to display on the display 8 the animated character which converses with the user (step S1 of FIG. 5A). Next, the portable data terminal 2 recognizes the speech obtained from the conversation with the user by the voice recognition engine (step S2), prepares script reflecting the content of the conversation (step S3), and executes the prepared script to perform predetermined processing (step S4). Due to this, the user can seemingly converse with the animated character displayed on the portable data terminal 2 and thereby make the portable data terminal 2 perform the predetermined processing.

Here, assume the case where the user gets into a car while carrying the portable data terminal 2 and thereby moves the terminal into the car. When the user gets into the car, he converses with the animated character during which he commands the transfer of the agent software to the car navigation system 3. When the portable data terminal 2 receives the command for transfer of the agent software from the user, it authenticates the car navigation system transferred to (step S5). When the car navigation system 3 transferred to receives the authentication command from the portable data terminal 2 sending the software, it authenticates the portable data terminal 2 sending the software (step T1).

Further, when the result of the authentication with the car navigation system 3 transferred to is positive, the portable data terminal 2 transmits the agent software and the voice recognition engine corresponding to the agent software from the short range wireless communicator 10 to the navigation system 3 and controls the display of the animated character based on the amount of data transmitted (step S6). Along with this, when the result of the authentication with the portable data terminal 2 sending the software is positive, the car navigation system 3 receives the agent software and the voice recognition engine corresponding to the agent software from the portable data terminal 2 by short range wireless communication and controls the display of the animated character based on the amount of the received data (step T2).

Figure 6A:
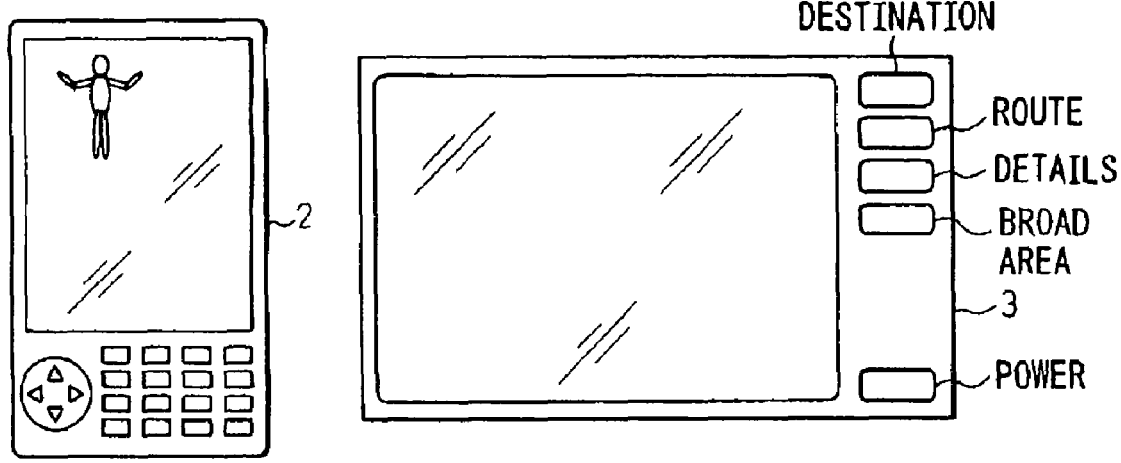
FIGS. 6A to 6C are views schematically showing modes of change of display of an animated character.
Figure 6B:
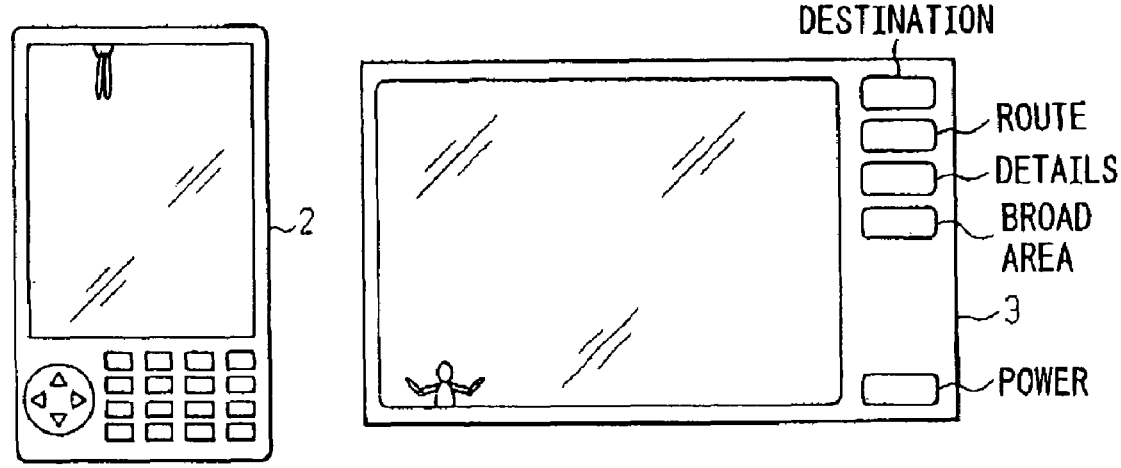
Figure 6C:
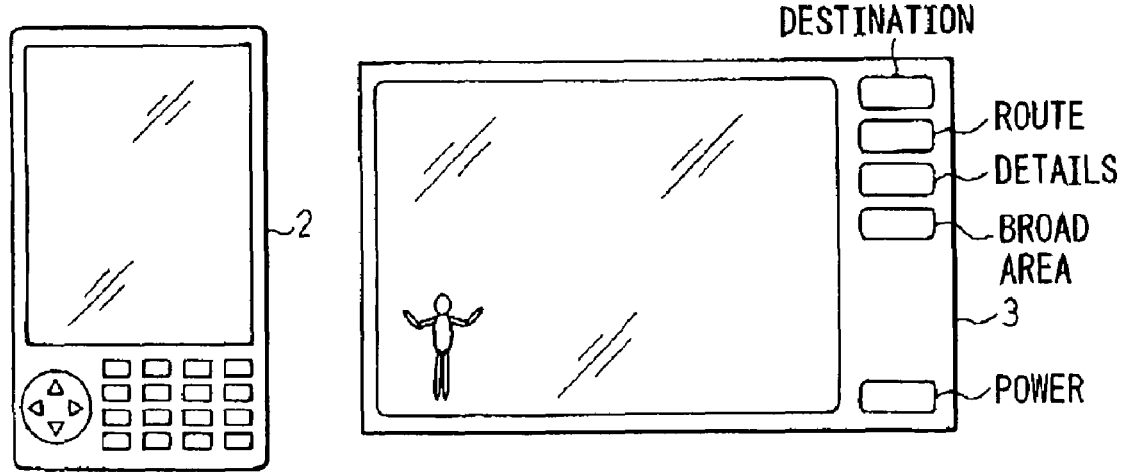

Explaining this specifically, as shown in FIGS. 6A to 6C, in the portable data terminal 2 sending the software, along with the elapse of time from the start of transmission of data to the car navigation system 3, that is, along with the amount of data transmitted to the car navigation system 3 becoming larger, the animated character is displayed such that it disappears from the display screen. On the other hand, in the car navigation system 3 transferred to, along with the elapse of time from the start of reception of the data from the portable data terminal 2, that is, along with the amount of data received from the portable data terminal 2 becoming larger, the animated character is displayed such that it appears on the display screen.

When the transfer of the agent software and the voice recognition engine corresponding to the engine software from the portable data terminal 2 ends, the car navigation system 3 runs the transferred agent software on the platform so as to display on the display the animated character which converses with the user (step T3). Further, the car navigation system 3 recognizes the speech obtained from the conversation with the user by the transferred voice recognition engine (step T4), prepares the script reflecting the content of the conversation (step T5), and executes the prepared script to perform the predetermined processing (step T6). Due to this, the user can seemingly converse with the animated character displayed on the car navigation system 3 and thereby make the car navigation system 3 perform the desired processing.

By the series of processing explained above, when the user gets in a car carrying the portable data terminal 2, he transfers the agent software from the portable data terminal 2 to the car navigation system 3 so as to make it possible for the car navigation system 3 to execute the agent software in the same way as the portable data terminal 2 executes the agent software. That is, when the user speaks the command for example "show me the telephone book" to the portable data terminal 2, the user can view the telephone book stored in the portable data terminal 2 and also when the user speaks the same command "show me the telephone book" to the car navigation system 3, the user can view the telephone book stored in the car navigation system 3.

While the case of the car navigation system 3 displaying an animated character on for example a display device provided near the center console was explained above, as shown in FIG. 7, the car navigation system 3 may also display the animated character on the front window. In this case, it is also possible to change the display of the animated character in accordance with the content of the processing performed by the car navigation system 3. Explaining this more specifically, when the car navigation system 3 is providing road guidance in accordance with a command from the user, it is possible to change the display of the animated character so that its head faces directly above when the direction in which the car is guided is straight ahead or change the display of the animated character so that its head faces the top right when the direction in which the car is guided is to the right or change the display of the animated character so that its head faces the top left when the direction in which the car is guided is to the left so as thereby to make the user recognize the direction in which the car is being guided.

(2) Case of User Transferring Agent Software from Portable Data Terminal 2 to Audio System 4

Next, the "case of the user transferring the agent software from the portable data terminal 2 to the audio system 4" will be explained with reference to FIGS. 8A and 8B to FIG. 9.

Here, assume the case of the user returning home while carrying the portable data terminal 2 and thereby bringing the terminal into the house. When the user returns home and brings the terminal into the house, he converses with the animated character and commands the transfer of the agent software to the audio system 4. When the portable data terminal 2 receives the command for transfer of the agent software from the user, it authenticates the audio system 4 transferred to (step S11). The audio system 4 transferred to receives the authentication command from the portable data terminal 2 sending the software and authenticates the portable data terminal 2 sending it (step U1).

When the result of authentication with the audio system 4 transferred to is positive, the portable data terminal 2 transmits the agent software and voice recognition engine corresponding to the agent software from the short range wireless communicator 10 to the audio system 4 by short range wireless communication and controls the display of the animated character based on the amount of the data transmitted (step S6). Along with this, when the result of authentication with the portable data terminal 2 sending the software is positive, the audio system 4 receives the agent software and the voice recognition engine corresponding to the agent software from the portable data terminal 2 by short range wireless communication and controls the display of the animated character based on the amount of data received (step U2).

When the transfer of the agent software and the voice recognition engine corresponding to the agent software from the portable data terminal 2 ends, the audio system 4 runs the transferred agent software on the platform so as to display on the display the animated character which converses with the user (step U3). Further, the audio system 4 recognizes the speech obtained from the conversation with the user by the transferred voice recognition engine (step U4), prepares the script reflecting the content of the conversation (step U5), and executes the prepared script to perform predetermined processing (step U6). Due to this, the user can seemingly converse with the animated character displayed on the audio system 4 and thereby make the audio system 4 perform the desired processing.

By the series of processing explained above, when the user returns home carrying the portable data terminal 2, he transfers the agent software from the portable data terminal 2 to the audio system 4 and he can make the audio system 4 execute the agent software in the same way as the portable data terminal 2 executes the agent software. That is, if the user speaks the command for example "tell me the time" to the portable data terminal 2, the user can learn the time from the time information displayed at the portable data terminal 2, and if the user speaks the same command "tell me the time" to the audio system 4, the user can learn the time from the time information displayed at the audio system 4.

Figure 9:
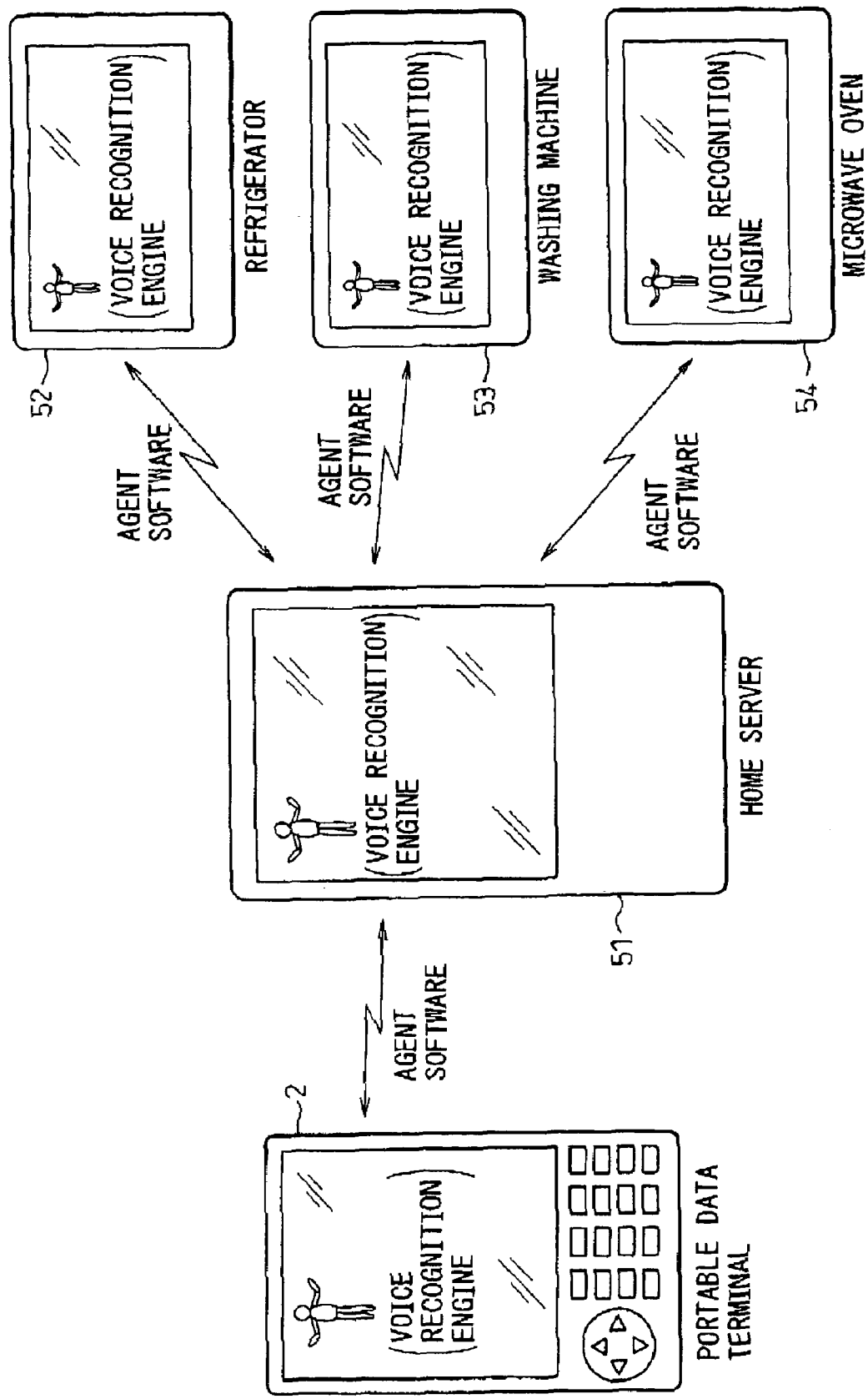
FIG. 9 is a view schematically showing a mode of transfer of agent software through a home server.

Note that above, the case of the agent software being transferred from the portable data terminal 2 to the audio system 4 was explained, but as shown in FIG. 9, it is also possible for the agent software to be transferred from the portable data terminal 2 to the home server 51 and then the agent software is transferred from the home server 51 to a refrigerator 52, washing machine 52, microwave oven 53, and other home appliances. In this case as well, due to the transfer of the agent software, the animated character is displayed at each of the displays of the home server 51, refrigerator 52, washing machine 53, and microwave oven 54.

Further, in the configurations of the above (1) and (2), if the agent software is transferred by a mode where the agent software disappears at the sender of the agent software, the user can only converse with the apparatus to which the agent software is transferred. That is, it is not possible to converse with the portable data terminal 2 sending the agent software and converse with the car navigation system 3 or audio system 4 receiving the agent software simultaneously.

As opposed to this, if the agent software does not disappear (remains) at the sender of the agent software, the user can converse with not only the device to which the agent software is transferred, but also the device transferring the agent software. That is, it is possible to converse with the portable data terminal 2 sending the agent software and converse with the car navigation system 3 or audio system 4 receiving the agent software simultaneously.

As explained above, according to the present embodiment, when the agent software and voice recognition engine are transferred from the portable data terminal 2, the car navigation system 3 or audio system 4 runs the transferred agent software so as to display a simulated human animated character which converses with the user, recognize the speech obtained from the conversation by the transferred voice recognition engine, prepare script reflecting the content of the conversation, and execute the prepared script to perform predetermined processing. Therefore, the same engine software can be used in common by the portable data terminal 2, car navigation system 3 and audio system 4.

That is, when the user transfers the agent software and the voice recognition engine corresponding to the agent software between the portable data terminal 2 and the car navigation system 3 or audio system 4, the user can make both the portable data terminal 2 and car navigation system 3 or audio system 4 perform the same processing by saying the same specific command without having to differentiate between a specific command for the portable data terminal 2 and a specific command for the car navigation system 3 or the audio system 4. That is, the user can use the car navigation system 3 or audio system 4 by the same procedure as the procedure for operating the portable data terminal 2. Due to this, it is possible to improve the human interface and possible to improve the level of convenience.

The present invention is not limited to the above embodiment and can be modified or expanded in the following way. The first electronic device may for example be configured as another device such as mobilephone other than a portable data terminal, while the second electronic device may be configured as another car-mounted system such as a hands-free system or other home appliance such as an air-conditioner. The animated character is not limited to a human form and may also be a dog, cat, or another animal shape. Further, the animated character may be a shape different depending on the type of the system or appliance or a shape designated by the user. By storing the script, it is also possible to execute the script again by judging the position or time as reference, that is, to automatically repeatedly execute predetermined script at a predetermined position or predetermined time. The transfer of the agent software is not limited to one visually informing the transfer to the user by the display of an animated character. It is also possible to configure the system to inform the transfer to the user by audio information.

While the invention has been described with reference to specific embodiments chosen for purpose of illustration, it should be apparent that numerous modifications could be made thereto by those skilled in the art without departing from the basic concept and scope of the invention.

What is claimed is:

1. A system for operating an electronic device using an animated character display comprising:
    a first electronic device runs agent software so as to display a simulated human animated character which converses with a user, recognizes speech obtained from that conversation by a voice recognition engine, prepares script reflecting the content of the conversation, and executes the prepared script to perform predetermined processing and
    a second electronic device runs agent software so as to display a simulated human animated character which converses with a user, recognizes speech obtained from that conversation by a voice recognition engine, prepares script reflecting the content of the conversation, and executes the prepared script to perform predetermined processing, wherein
    said first electronic device transfers the agent software and the voice recognition engine corresponding to said agent software to said second electronic device and
    said second electronic device, when the agent software and the voice recognition engine are transferred from said first electronic device, runs the transferred agent software so as to display a simulated human animated character which converses with a user, recognizes speech obtained from that conversation by the voice recognition engine, prepares script reflecting the content of the conversation, and executes the prepared script to perform predetermined processing, wherein
    said first electronic device changes the animated character corresponding to the agent software in the middle of transfer of the agent software to said second electronic device,
    said second electronic device changes the display of the animated character corresponding to the agent software in the middle of transfer of the agent software from said first electronic device, and further
    said first electronic device changes the display of the animated character corresponding to the agent software based on the amount of data transferred, and
    said second electronic device changes the display of the animated character corresponding to the agent software based on the amount of data transferred.

2. A system for operating an electronic device using an animated character display as set forth in claim 1, wherein said first electronic device has the function of updating the precision of voice recognition in the voice recognition engine.

3. A system for operating an electronic device using an animated character display as set forth in claim 1, wherein
    said first electronic device or said second electronic device changes the display of the animated character in accordance with the content of said predetermined processing.

4. A system for operating an electronic device using an animated character display as set forth in claim 1, wherein
    among said first electronic device and said second electronic device, only one of these devices can run common agent software at the same timing.

5. A system for operating an electronic device using an animated character display as set forth in claim 1, wherein
    said first electronic device is comprised of a portable terminal which a user can carry and
    said second electronic device is comprised of a car-mourned system mounted in a car or a home appliance installed in the home.

6. A system for operating an electronic device using an animated character display comprising:
    a first electronic device runs agent software so as to display a simulated human animated character which converses with a user, recognizes speech obtained from that conversation by a voice recognition engine, prepares script reflecting the content of the conversation, and executes the prepared script to perform predetermined processing and
    a second electronic device runs agent software so as to display a simulated human animated character which converses with a user, recognizes speech obtained from that conversation by a voice recognition engine, prepares script reflecting the content of the conversation, and executes the prepared script to perform predetermined processing, wherein
    said first electronic device transfers the agent software and the voice recognition engine corresponding to said agent software to said second electronic device and
    said second electronic device, when the agent software and the voice recognition engine are transferred from said first electronic device, runs the transferred agent software so as to display a simulated human animated character which converses with a user, recognizes speech obtained from that conversation by the voice recognition engine, prepares script reflecting the content of the conversation, and executes the prepared script to perform predetermined processing, wherein
    among said first electronic device and said second electronic device, both the devices can run common agent software at the same timing.

* * * * *